United States Patent
Ouhadi

(10) Patent No.: US 8,592,524 B2
(45) Date of Patent: Nov. 26, 2013

(54) THERMOPLASTIC ELASTOMER COMPOSITIONS

(75) Inventor: Trazollah Ouhadi, Liege (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 184 days.

(21) Appl. No.: 12/811,287

(22) PCT Filed: Dec. 8, 2008

(86) PCT No.: PCT/EP2008/010387
§ 371 (c)(1),
(2), (4) Date: Aug. 10, 2010

(87) PCT Pub. No.: WO2009/092420
PCT Pub. Date: Jul. 30, 2009

(65) Prior Publication Data
US 2010/0331466 A1    Dec. 30, 2010

(30) Foreign Application Priority Data
Jan. 25, 2008  (EP) ..................... 08001375

(51) Int. Cl.
*C08F 299/08* (2006.01)
*C08F 299/00* (2006.01)
*C08F 2/06* (2006.01)

(52) U.S. Cl.
USPC ........... 525/192; 525/515; 525/55; 525/88; 525/191; 264/328.1

(58) Field of Classification Search
USPC ........... 524/515; 525/208, 515, 55, 88, 191, 525/192; 264/328.1
See application file for complete search history.

(56) References Cited

U.S. PATENT DOCUMENTS

| 4,540,753 | A | 9/1985 | Cozewith et al. |
|---|---|---|---|
| 5,171,908 | A | 12/1992 | Rudnick |
| 5,258,464 | A | 11/1993 | McCullough, Jr. et al. |
| 5,362,782 | A | 11/1994 | McCullough, Jr. et al. |
| 5,747,592 | A | 5/1998 | Huff et al. |
| 5,783,531 | A | 7/1998 | Andrew et al. |
| 5,847,052 | A | 12/1998 | Hamanaka et al. |
| 6,207,746 | B1 | 3/2001 | Uchida et al. |
| 6,207,756 | B1 | 3/2001 | Datta et al. |
| 6,506,842 | B1 | 1/2003 | Heck et al. |
| 6,867,260 | B2 | 3/2005 | Datta et al. |
| 2003/0092846 | A1 | 5/2003 | Zhao et al. |
| 2003/0105232 | A1 | 6/2003 | Zhao et al. |
| 2004/0054040 | A1 | 3/2004 | Lin et al. |
| 2006/0211819 | A1* | 9/2006 | Hoenig et al. ............. 525/88 |
| 2007/0270540 | A1* | 11/2007 | Kanae et al. ............. 524/515 |
| 2007/0276092 | A1* | 11/2007 | Kanae et al. ............. 525/208 |

FOREIGN PATENT DOCUMENTS

| EP | 0 123 946 | 11/1984 |
|---|---|---|
| EP | 0 128 045 | 12/1984 |
| EP | 0 260 999 | 3/1988 |
| EP | 0 277 004 | 8/1988 |
| EP | 0 751 182 | 1/1997 |
| EP | 1 448 618 | 8/2004 |
| WO | WO 93/03093 | 2/1993 |
| WO | WO 00/24793 | 5/2000 |
| WO | WO 01/64980 | 9/2001 |
| WO | WO 03/042255 | 5/2003 |
| WO | WO 2004/014988 | 2/2004 |
| WO | WO 2005/068547 | 7/2005 |

OTHER PUBLICATIONS

G. VerStrate et al., "*Near Monodisperse Ethylene-Propylene Copolymers by Direct Ziegler-Natta Polymerization. Preparation, Characterization, Properties*", Macromolecules, 1988, vol. 21, pp. 3360-3371.
A.R. Cooper, "*Molecular Weight Determination*",Concise Encyclopedia of Polymer Science and Engineering, John Wiley & Sons, 1990, pp. 638-639.
Rudnick et al.,"*Poly(α-olefins)*", Synthetic High-Performance Fluids: Chemistry, Technology, and Commercial Importance, Marcel Dekker, Inc., pp. 1-52, (1999).

* cited by examiner

*Primary Examiner* — James J Seidleck
*Assistant Examiner* — Deve E Valdez

(57) ABSTRACT

The present invention relates to polymer compositions with improved scratch resistance and no or low gloss change of the finished product during heat ageing, methods for making the compositions and useful articles made thereof.

17 Claims, No Drawings

THERMOPLASTIC ELASTOMER COMPOSITIONS

CROSS REFERENCE TO RELATED APPLICATIONS

This application is a 371 National Stage Application of International Application No. PCT/EP2008/010387, filed Dec. 8, 2008, that claims the benefit of European Patent Application No. 08001375.8, filed Jan. 25, 2008, all of which are incorporated herein by reference in their entireties.

FIELD OF THE INVENTION

The present invention relates to polymer compositions with good scratch resistance and no or low gloss change after heat ageing of the finished shaped article made of the compositions, to methods for making the compositions and to useful articles made thereof. In particular, the invention relates to a composition comprising a thermoplastic resin, an ethylene alpha-olefin plastomer, and low amounts of a peroxide. In another embodiment, the invention relates to a composition comprising a thermoplastic resin, a rubber, and, optionally, low amounts of a peroxide. The present invention also relates to a method of reducing gloss change in a finished shaped article made of polymer compositions, and/or to a method of reducing the shear viscosity of such compositions.

BACKGROUND OF THE INVENTION

It is known in the art to prepare polymer compositions comprising a thermoplastic polymer matrix within which reinforcing fillers are dispersed. Industrial and automotive applications frequently use filled polymer systems to provide desirable mechanical properties, such as stiffness or scratch/mar resistance.

It is also known in the art to prepare polymer compositions comprising a thermoplastic polymer matrix and a plastomer additive. The plastomer often imparts impact resistance and flexibility to the thermoplastic polymer matrix, thereby rendering it more useful in common applications such as automobile parts. See e.g. U.S. Pat. No. 5,747,592.

It is further known in the art to prepare polymer compositions comprising a thermoplastic polymer and an elastomer in order to obtain compositions having good tensile properties, see e.g. EP 0 751 182 A1.

In the art, polyvinyl chloride is a material that has been used where softness (feel) of the finished surface and good processability are desired. This is a particular need in the automotive industry, where attractive surface properties, as well as hardness and (scratch) resistance of the material are desired, while the material should be quick, easy and cost-efficient to process. Polyvinyl chloride is, however, not recyclable and therefore less desirable from an environmental point of view. Therefore, there is still a need in the art to provide recyclable materials that can be used as alternatives to polyvinyl chloride for the fabrication of articles such as rubbery, thinner sheets used as skin layers over a core substrate, for use in automotive interior parts, such as instrument or door panels. Such materials should also have a good processability, i.e., should exhibit high flow under high shear conditions such as during injection molding for a quick, easy, and cost effective production. Furthermore, the finished article made from such materials should have attractive surface properties, in particular should have a soft feel, without feeling sticky (or becoming sticky after heat ageing), and should not exhibit any visible gloss change after heat ageing. Additionally, the article should have good hardness, and its surface should be scratch resistant.

U.S. Pat. No. 6,506,842 discloses thermoplastic elastomer compositions comprising a blend of an ethylene/alpha-olefin polymer or a diene-modified ethylene/alpha-olefin polymer and a high melting polymer such as polypropylene. The rheology of these compositions is modified by the addition of peroxide, such that the compositions exhibit an increased shear thinning index. However, nothing is disclosed in U.S. Pat. No. 6,506,842 regarding how to obtain surfaces that are scratch resistant, have a soft feel, and exhibit low or no gloss change and low or no stickiness after heat ageing.

U.S. Pat. No. 6,207,746 discloses thermoplastic polymer compositions having improved environmental stress crack resistance and thermal resistance. The compositions comprise an ethylene alpha-olefin polymer, a polypropylene, an oil and a radical initiator. They exhibit a significant degree of cross-linking and consequently have a high viscosity which renders them less suitable for injection molding. There is no disclosure of how to improve surface scratch resistance and how to avoid or reduce surface gloss change and surface stickiness after heat ageing.

US 2003/0092846 relates to a polymer blend comprising a polypropylene resin and an ethylenic elastomer, wherein the polypropylene resin is partially branched and/or the elastomer is partially crosslinked by the addition of a multifunctional acrylic monomer containing at least three acrylate groups. The composition is disclosed to exhibit increased melt strength (and therefore high viscosity). There is no disclosure of how to improve surface scratch resistance and how to avoid or reduce surface gloss change and surface stickiness after heat ageing.

US 2003/0105232 discloses olefinic thermoplastic elastomer compositions to which free radical initiators and co-curative agents are added. The compositions have high melt strength, high viscosity and low melt flow rate. This reference does not mention scratch resistance and does not relate to gloss change after heat-ageing. WO 2005/068547 relates to thermoplastic elastomer compositions which may comprise crosslinking agent and a co-agent. The compositions have high viscosity. No mention is made of scratch resistance or of avoiding gloss change after heat ageing.

WO 03/042255 discloses a thermoplastic elastomer composition formed from melt blending a thermoplastic olefinic elastomer with sufficient amounts of a free radical generator, such as a peroxide, and a co-agent. The resulting composition is disclosed to have an increased melt strength, a decreased melt flow rate and a reduced surface gloss level. It is disclosed that the use of peroxide at very low levels without using a co-agent does not result in compositions having an increased melt strength, decreased melt flow rate and reduced surface gloss level.

The present invention provides polymer compositions that have a low shear viscosity and thus good processability when injection molded, good scratch resistance and favorable surface properties of the finished shaped article such as low stickiness and no or only low surface gloss change after heat ageing. This is surprisingly achieved by the present invention by combining, in one aspect, a thermoplastic resin, an ethylene alpha-olefin plastomer, and low amounts of a peroxide, and in another embodiment, a thermoplastic resin, an elastomer, and, optionally, low amounts of a peroxide. In a further aspect, the present invention provides methods for improving the scratch resistance, and/or decreasing the surface gloss change and the stickiness after heat ageing, and/or reducing the shear viscosity of thermoplastic elastomer compositions, useful articles made of such polymer compositions and methods of making the compositions and the useful articles.

SUMMARY OF THE INVENTION

One aspect of the present invention is directed to a composition comprising a thermoplastic resin, an ethylene alpha-olefin plastomer, and a peroxide, wherein the amount of peroxide is from about 0.05 to about 2.0 wt %, based on the total weight of the composition, and wherein the composition is substantially free of any co-agent.

The present invention also relates to a composition comprising a thermoplastic resin, an ethylene alpha-olefin plastomer, and a peroxide, wherein the amount of peroxide is from about 0.05 to about 2.0 wt %, based on the total weight of the composition, and wherein a VW K09 grained shaped article made of the composition exhibits a surface gloss change after 96 hours at 120° C. of less than 2.0, as determined in accordance with ASTM D523 at 60°.

The present invention further relates to a method of reducing surface gloss change after heat ageing of a shaped article made of a composition comprising a thermoplastic resin and an ethylene alpha-olefin plastomer, and/or of reducing the shear viscosity of said composition, the method comprising adding to the composition a peroxide in an amount of 0.05 to 2.0 wt %, based on the total weight of the composition.

The present invention furthermore relates to a method of preparing a composition, the method comprising melt blending a thermoplastic resin, an ethylene alpha-olefin plastomer, and a peroxide in an amount of from about 0.05 to about 2.0 wt %, based on the total weight of the composition, wherein the composition is substantially free of any co-agent.

In another aspect the present invention relates to a composition comprising a thermoplastic resin, a rubber, and optionally a peroxide, wherein the amount of peroxide, if present, is from about 0.05 to about 2.0 wt %, based on the total weight of the composition, and wherein the composition is substantially free of any co-agent.

The present invention further relates to a composition comprising a thermoplastic resin, a rubber, and optionally a peroxide, wherein the amount of peroxide, if present, is from about 0.05 to about 2.0 wt %, based on the total weight of the composition, and wherein a VW K09 grained shaped article made from the composition exhibits a surface gloss change after 96 hours at 120° C. of less than 2.0, as determined in accordance with ASTM D523 at 60°.

The present invention further relates to a method of reducing the shear viscosity of a composition comprising a thermoplastic resin and a rubber and/or of reducing surface gloss change after heat ageing of a shaped article made of the composition, the method comprising adding to the composition a peroxide in an amount of 0.05 to 2.0 wt %, based on the total weight of the composition.

The present invention also relates to a method of preparing a composition, the method comprising melt blending a thermoplastic resin, a rubber, and optionally a peroxide in an amount of from about 0.05 to about 2.0 wt %, based on the total weight of the composition.

The present invention also relates to an injection molding process comprising melting in an extruder a composition according to any of the other aspects of the present invention, and injection molding the composition.

One aspect of the present invention is a shaped article comprising the composition of any of the above aspects. The invention also relates to an automotive interior component comprising such shaped article.

The present invention finally relates to a method of making a shaped article, comprising the injection molding process mentioned above.

DETAILED DESCRIPTION

Definitions

As used herein, the term "polymer" refers to the product of a polymerization reaction, and is inclusive of homopolymers and copolymers.

As used herein, unless specified otherwise, the term "copolymer(s)" refers to polymers formed by the polymerization of two or more different monomers. For example, the term "copolymer" includes the copolymerization reaction product of ethylene and an alpha-olefin, such as 1-hexene, 1-butene or 1-octene. However, the term "copolymer" is also inclusive of, for example, the copolymerization of a mixture of ethylene, propylene, 1-hexene, 1-butene and 1-octene. Copolymers of three different monomers are also known as "terpolymers".

As used herein, when a polymer is referred to as "comprising a monomer", the monomer is present in the polymer in the polymerized form of the monomer (also referred to as the "monomer unit").

As used herein, "plastomers" are a family of ethylene alpha-olefin copolymers that bridge the gap between elastomers and plastics. Both rubber-like properties and plastic processability are realized in one material. They are defined hereinbelow.

As used herein, the term "rubber" shall have the same meaning as the term "elastomer". "Rubbers" or "elastomers" are materials having the ability to undergo elastic deformation. The two terms "rubber" and "elastomer" are used interchangeably herein, may also be defined in accordance with ASTM D1566, and are further defined hereinbelow.

The terms "thermoplastic" or "thermoplastic resin" can be used herein interchangeably. These materials generally become softer when heated, and harden again when cooled. They can be molded and shaped when heated, and they will keep their shape when cooled. They are further defined hereinbelow.

As used herein, "molecular weight" means weight average molecular weight ("Mw"). Mw is determined using Gel Permeation Chromatography. Molecular Weight Distribution ("MWD") means Mw divided by number average molecular weight ("Mn"). (For more information, see U.S. Pat. No. 4,540,753 to Cozewith et al. and references cited therein, and in Verstrate et al., 21 Macromolecules 3360 (1998)). The "Mz" value is the high average molecular weight value, calculated as discussed by A. R. Cooper in Concise Encyclopedia of Polymer Science and Engineering 638-39 (J. I. Kroschwitz, ed. John Wiley & Sons 1990).

As used herein, weight % ("wt %"), unless noted otherwise, means % by weight of a particular component based on the total weight of the mixture containing the component.

For purposes of the present invention, Melt Flow Rates (MFR) are determined in accordance with ASTM D 1238, condition E, at 230° C. and 2.16 kg load.

For the purposes of the present invention, the scratch resistance is determined in accordance with ISO 4586-02 using VW K09 grained 2 mm plaques with pigmented composition in order to make the rating easier. In accordance with this method, the scratch resistance is rated by means of scores from 1 (poor) to 5 (excellent). A score of at least 3.5, preferably at least 4.0, more preferably at least 4.5, is found satisfactory for the purposes of the present invention.

For the purposes of the present invention, the surface gloss change of a VW K09 grained shaped article after heat ageing is determined against a standard of highly polished black glass in accordance with ASTM D523 (in particular, ASTM D523-89). The values reported in the examples are the average values of three measurements of specular gloss at an angle of 60° (on the grained side), both before and after heat ageing (e.g. for 96 hours at 120° C.) of one and the same 2 mm plaque sample. The gloss of the sample before and after heat ageing is to be measured at the identical location (spot) on the sample, under identical measurement conditions (e.g. orientation of the sample etc.). The gloss change value referred to herein and in the claims is determined by the difference in gloss value measured after and before heat ageing (at 120° C. for 96 hours) as described above. Preferably, the surface gloss change after 96 hours at 120° C. of shaped articles made of the compositions of the present invention is less than 2.0, preferably less than 1.5, and more preferably less than 1.0.

For the purposes of the present invention, "VW K09 grained" plaques are plaques according to the industry standard "VW K09" (or "VW k09") established by Volkswagen. For the purpose of the present invention, VW K09 grained (or "VW K09 textured") samples are prepared by injection molding, using a mold which has been surface textured by Mold-Tech™ according to the Mold-Tech™ texture identification number MT10.039 (sometimes also referred to as MT10039).

For the purposes of the present inventions, the tensile strength, the elongation at break and the modulus at 100% strain are determined in accordance with ISO 37 on injection molded plaques of 2 mm thickness (ISO plaques), both perpendicular to flow and parallel to flow, and using a test speed of 500 mm/min.

For the purposes of the present inventions, the shear viscosity is determined in accordance with ASTM D3835-79, or DIN54811 (technically equivalent) in a capillary rheometer at 230° C., using a Göttfert Rheo-Tester 1000 at different shear rates.

For the purposes of the present inventions, the hardness is determined in accordance with ISO 868.

Composition

The compositions of the present invention comprise at least a thermoplastic resin, an ethylene alpha-olefin plastomer or a rubber, and in certain embodiments a peroxide, as defined in the claims.

The compositions according to all aspects of the present invention may contain further components as explained below, such as a scratch resistance improving additive. The thermoplastic resin, the ethylene alpha-olefin plastomer, the rubber, the peroxide, and any additional components are described in further detail below.

Thermoplastic Resin

The thermoplastic resins used in the compositions of the present invention may include solid, generally high molecular weight resins. In one or more embodiments, these thermoplastic resins include un-functionalized resins. In other embodiments, the thermoplastic component may include a functionalized thermoplastic resin either alone or in combination with an unfunctionalized resin.

The thermoplastic resins may include crystalline, semi-crystalline and crystallizable polymers. In one or more embodiments, these resins may be characterized by a crystallinity of at least 25% by weight, preferably at least 30% by weight, and more preferably at least 35% by weight. Crystallinity may be determined according to DSC procedures in accordance with ASTM E-794-95 by dividing the heat of fusion of a sample by the heat of fusion of a 100% crystalline polymer, which is assumed to be 209 J/g for polypropylene or 350 J/g for polyethylene. Where the thermoplastic resin of one or more embodiments is propylene-based, the resins may be characterized by a heat of fusion of at least 50 J/g, preferably equal to or in excess of 75 J/g, and more preferably equal to or in excess of 100 J/g. Where the thermoplastic resins of one or more embodiments are polyethylene-based, they may be characterized by a heat of fusion of at least 85 J/g, preferably at least 100 J/g, and more preferably at least 130 J/g.

The thermoplastic resins used in the present invention can be characterized by an Mw of from about 30 to about 2,000 kg/mole, preferably from about 100 to about 600 kg/mole. They may also be characterized by an Mn of about 20 to about 1,000 kg/mole, and preferably about 35 to about 300 kg/mole, as measured by GPC with polystyrene standards.

The thermoplastic resins used in the present invention can have an MFR (ASTM D-1238, 2.16 kg @ 230° C.) of less than about 5,000 dg/min, preferably less than about 4500 dg/min, more preferably from about 50 to about 4000 dg/min, even more preferably from about 75 to about 3500 dg/min, and most preferably from about 100 to about 3000 dg/min.

The thermoplastic resins used in the present invention can have a melt temperature (or melting point) Tm from about 110° C. to about 250° C., preferably from about 155° C. to about 170° C., and most preferably from about 160° C. to about 165° C. They may have a glass transition temperature (Tg) from about −10 to about 10° C., preferably from about −3 to about 5° C., and most preferably from about 0° C. to about 2° C. They may have a crystallization temperature (Tc) of at least about 75° C., preferably at least about 95° C., more preferably at least about 100° C., and most preferably at least about 105° C., particularly from 105° to 115° C.

Exemplary thermoplastic resins for use in the present invention include polyolefins, olefin copolymers, and non-olefin resins. The thermoplastic resins may be formed e.g. by polymerizing ethylene or α-olefins such as propylene, 1-butene, 1-pentene, 1-hexene, 1-heptene, 1-octene, 1-nonene, 1-decene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Specifically included are the reactor, impact, and random copolymers of propylene with ethylene or the other α-olefins listed above, or with $C_{10}$-$C_{20}$ diolefins. Comonomer, e.g., ethylene, contents for these propylene copolymers may be from about 1% to about 30% by weight of the polymer, more preferably the ethylene content in the propylene polymer is from about 1% to about 10% by weight, see for example U.S. Pat. No. 6,867,260 B2. Other polyolefin copolymers may include copolymers of olefins with styrene such as styrene-ethylene copolymer or polymers of olefins with α,β-unsaturated acids or α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymers are also suitable in accordance with this invention.

The thermoplastic polymers may be synthesized by using an appropriate polymerization technique known in the art such as, but not limited to, the conventional Ziegler-Natta type polymerizations, as well as catalysis employing single-site organometallic catalysts including, but not limited to, metallocene catalysts.

The thermoplastic resins as used in the present invention are preferably propylene-based resins. They may be polypropylene homopolymers or propylene copolymers. The comonomers may be ethylene and/or $C_4$ to $C_{10}$ alpha-olefins. The thermoplastic resins may also be a "propylene random copolymer" ("RCP") or a "propylene impact copolymer" ("ICP"). RCP are propylene copolymers wherein the comonomer is randomly distributed over the polymer chain. In other words, the sequence distribution of the propylene monomer and the comonomer(s) is random. An ICP is an in situ reactor blend of two phases or components, a matrix component and a copolymer rubber component dispersed in the matrix. Propylene impact copolymers are also sometimes referred to in the art as "propylene heterophasic copolymers" or "propylene block copolymers". As is known in the art, impact copolymers are usually produced in a sequential series polymerization process wherein the matrix component, often a homopolymer, is produced in one or more initial reactors and then transferred to one or more subsequent reactors where the copolymer is produced and incorporated within the matrix component. The copolymer component has rubbery characteristics and provides the desired impact resistance, whereas the matrix component provides overall stiffness. Examples of propylene impact copolymers and processes for producing them are disclosed in U.S. Pat. Nos. 5,258,464, 5,362,782 and 6,207,756 and International Patent Publication No. WO 01/64980.

In a preferred embodiment, the thermoplastic resin of the present invention are propylene impact copolymers comprising from 1 to 30 wt % ethylene derived units. The propylene impact copolymers may comprise from 50 to 95 wt % propylene homopolymers and from 5 to 50 wt % ethylene-propylene copolymers. The ethylene-propylene copolymer phase may comprise from 35 to 55 wt % ethylene derived units, and may exhibit an intrinsic viscosity of from 1.0 to 15.0. The propylene impact copolymer suitable as thermoplastic resin in the present invention may further exhibit an MFR (ASTM D-1238, condition E; 2.16 kg @ 230° C.) of at least 20 dg/min, preferably at least 30 dg/min, more preferably at least 50 dg/min, and most preferably at least 70 dg/min. Preferably, at least two propylene impact copolymers are present in the thermoplastic resin and exhibit MFRs in excess of 20 dg/min for the first impact copolymer and in excess of 70 dg/min for the second impact copolymer.

In another preferred embodiment, the thermoplastic resin is a homopolymer of a high-crystallinity isotactic or syndiotactic polypropylene. The homopolypropylene may be partly or largely isotactic. It can have a density of from about 0.85 to about 0.91 g/cc, with the largely isotactic polypropylene having a density of from about 0.90 to about 0.91 g/cc.

Also, high and ultra-high molecular weight polypropylene with a fractional melt flow rate can be used. Such thermoplastic polypropylene resins are characterized by an MFR (ASTM D-1238, condition E; 2.16 kg @ 230° C.) of less than or equal to 10 dg/min, more preferably less than or equal to 1.0 dg/min, and most preferably less than or equal to 0.5 dg/min.

In a further preferred embodiment, so-called ultra-high flow polypropylene can be used as the thermoplastic resin of the present invention. Such materials may be homopolypropylenes and may have an MFR (ASTM D-1238, condition E; 2.16 kg @ 230° C.) that is at least 100 dg/min, preferably at least 500 dg/min, and most preferably at least 1000 dg/min. Examples for such ultra-high flow homopolypropylenes are those sold under the tradename BORFLOW™ by Borealis.

Most preferably, the thermoplastic resin in all aspects of the present invention is a propylene homo- or copolymer having an MFR of greater than about 70 dg/min, preferably from about 100 to about 3000 dg/min, and having a Tm of from about 155 to about 170° C.

Ethylene Alpha-Olefin Plastomer

The term "ethylene alpha-olefin plastomer" is used in the context of the present invention to refer to ethylene alpha-olefin based copolymers which have many of the characteristics of elastomers but can be converted into finished products by thermoplastic processes such as molding or extrusion. The elastomeric properties originate from a low level of crystallinity and an increased level of amorphousness. With lower crystallinity, one also obtains low melting points. The melt processability is also associated with molecular weights more similar to those encountered with linear low density polyethylene used in making films, and less than those encountered with ethylene propylene rubbers.

The ethylene alpha-olefin plastomers used in the present invention may equally be described and referred to as "ethylene-α-olefin copolymers", and include copolymers of ethylene and one or more α-olefin comonomers. The term "ethylene alpha-olefin copolymer" generally includes materials such as high density polyethylene (HDPE), medium density polyethylene (MDPE), low density polyethylene (LDPE), linear low density polyethylene (LLDPE), and very low and ultra low density polyethylene (VLDPE and ULDPE).

The ethylene-α-olefin copolymers may include at least 15% by weight, preferably at least 30% by weight, and more preferably at least 50% by weight units derived from an α-olefin comonomer, based upon the total weight of the copolymer. However, in these or other embodiments, the ethylene-α-olefin copolymer may also include less than 55% by weight, preferably less than 45% by weight, and more preferably less than 40 weight % α-olefin comonomer units, based upon the total weight of the copolymer. Preferably, the ethylene alpha-olefin plastomer comprises from about 10 to about 40 wt % alpha-olefin derived units, more preferably from about 15 to about 35 wt %, and most preferably from about 20 to about 30 wt % alpha-olefin units, based upon the total weight of the copolymer. The ethylene alpha-olefin plastomer comprises $C_3$ to $C_{10}$ alpha-olefin derived units. The α-olefin comonomers include, but are not limited to, propene, 1-butene, 1-pentene, 1-hexene, 1-heptene, 1-octene, 1-nonene, 1-decene, 4-methyl-1-pentene, and mixtures thereof. 1-Octene and 1-hexene are the preferred comonomers.

The ethylene-α-olefin copolymer used as the ethylene alpha-olefin plastomer in the present invention may be characterized by a density, as determined at room temperature per ASTM D-792, that is less than about 0.915 g/cc, preferably less than about 0.90 g/cc, more preferably less than about 0.88 g/cc, even more preferably from about 0.855 to about 0.875 g/cc, and most preferably from about 0.855 to about 0.870 g/cc.

The ethylene-α-olefin copolymer used as the ethylene alpha-olefin plastomer in the present invention may be characterized by a glass transition temperature ($T_g$), as determined by DSC, that is less than −20° C., preferably less than −30° C., more preferably less than −50° C., and most preferably from about −20° C. to about −60° C.

The ethylene-α-olefin copolymer used as the ethylene alpha-olefin plastomer in the present invention can have a melt flow rate (MFR, in accordance with ASTM D-1238 Condition E; 2.16 kg @ 230° C.) that is less than or equal to about 100 dg/min, preferably less than or equal to about 50 dg/min, such as about 0.3 to about 50 dg/min, more preferably from about 0.5 to about 40 dg/min, and most preferably from about 0.5 to about 35 dg/min.

The ethylene-α-olefin copolymer used as the ethylene alpha-olefin plastomer in the present invention may be characterized by a narrow composition distribution (expressed through the composition distribution breadth index, CDBI), as determined by using the procedure set forth in WO 93/03093, i.e., a CDBI of above 60%, preferably above 70%, more preferably above 80%, and most preferably above 90%. A high CDBI tends to indicate a low extractability.

The molecular weight distribution of the ethylene alpha-olefin plastomer used in the present invention is preferably narrow, generally from 1.5 to 4, preferably from 1.8 to 3. The molecular weight distribution may be broadened if the polymerization is conducted in a dual reactor set up or with mixed catalysts producing a reactor blend as in EP-A-0 128 045.

Because of the low crystallinity and melting points, heterogeneous polymerization processes, such as gas phase polymerization or slurry-type polymerization are restricted to the higher plastomer densities. A fuller range of densities can be obtained by homogeneous polymerization processes such as high pressure polymerization or solution polymerization. While conventional Ziegler Natta catalysts have been used, most commercial plastomers are produced using metallocene catalysts activated by alumoxanes (see e.g. EP-A 260 999) or non-coordinating anions (see e.g. EP-A 277 004). Depending on the process and catalyst adopted, the plastomer may have a greater or lesser level of long chain branching (LCB). Higher levels of LCB can be detected from improved melt processability including improved shear sensitivity.

The randomness of comonomer distribution along the length of the polymer chain (referred to as the sequence distribution) is usually high, and the presence of blocks of comonomers next to each other is therefore low. Thus the polymers are often super-random.

One type of ethylene alpha-olefin plastomer may be made by the process generally described in WO00/24793 incorporated by reference for US purposes and is sold commercially by ExxonMobil Chemical Company under the brand name EXACT™. Another type of plastomers suitable in the present invention are the TAFMER™ materials supplied by Mitsui Petrochemical Corporation. All these afore-mentioned materials generally include copolymers of ethylene with one or more comonomers selected from $C_3$ to $C_{10}$, e.g. alpha-olefins such as propene, butene-1, hexene-1, octene-1, in which the molecules of the copolymers comprise long chains with relatively few side chain branches or cross-linked structures. Other ethylene alpha-olefin copolymers, available from the Dow Chemical Company, known as ENGAGE™, AFFINITY™ and ATTANE™ resins, may also be used as the plastomer in the present invention.

Preferred ethylene alpha-olefin plastomers in all aspects of the present invention are ethylene alpha-olefin copolymers having a density of less than about 0.88 g/cc, preferably of from about 0.55 to about 0.875 g/cc, an MFR from about 0.3 to about 50, preferably from about 0.5 to about 35 dg/min, an MWD of 1.5 to 4, and a CDBI of above 80%.

Rubber

Rubbers (or "elastomers") useful in the present invention may include mixtures of more than one rubber. Non-limiting examples of rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof. Olefinic elastomeric copolymers may specifically include propylene-based rubbery copolymers and butyl rubber as described hereinbelow.

Propylene-Based Rubbery Copolymer

The propylene-based rubbery copolymer, which may also be referred to as propylene-α-olefin copolymer, includes units derived from propylene, one or more comonomer units derived from ethylene or α-olefins including from 4 to 20 carbon atoms, and optionally one or more comonomer units derived from dienes. The α-olefin comonomer units may derive from ethylene, 1-butene, 1-hexene, 4-methyl-1-pentene and/or 1-octene. The diene comonomer units may derive from 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, dicyclopentadiene, or a combination thereof. Preferably, the propylenep-based rubbery copolymer includes ethylene, propylene and optionally diene-derived units.

The propylene-based rubbery copolymer may include at least 5% by weight, preferably at least 10% by weight, more preferably at least 15% by weight, more preferably at least 20% by weight, and even more preferably at least 25% by weight α-olefin-derived units, based on the total weight of the propylene-derived, α-olefin derived, and diene-derived units. In some embodiments, the copolymers may include even higher amounts of α-olefin, such as at least 45% by weight, preferably at least 50% by weight, more preferably at least 60% by weight, based upon the total weight of the propylene-derived, α-olefin derived, and diene-derived units.

In one or more embodiments, the propylene-based rubbery copolymer may include at least 0.5% by weight, preferably at least 1.5% by weight, and more preferably at least 3% by weight diene-derived units; in these or other embodiments, the propylene-based rubbery copolymers may also include up to 11% by weight, preferably up to 6% by weight, and more preferably up to 4% by weight diene-derived units, where the percentage by weight is based upon the total weight of the propylene-derived, α-olefin-derived, and diene-derived units. Preferably, the propylene-based rubbery copolymers contain from 0 to 10% by weight, preferably from 0.5 to 11% by weight diene-derived units, and more preferably from 1.5 to 6% by weight diene-derived units, based upon the total weight of the propylene-derived, α-olefin-derived, and diene-derived units.

The propylene-based rubbery copolymer for use in this invention may have a single melting temperature (or melting point) as determined by differential scanning calorimetry (DSC). The melting point is defined as the temperature of the greatest heat absorption within the range of melting of the sample. The propylene-based rubbery copolymer may show secondary melting peaks adjacent to the principal peak, but for purposes herein, these secondary melting peaks are considered together as a single melting point, with the highest of these peaks being considered the melting point ($T_m$) of the propylene-based rubbery copolymer. In one or more embodiments, the $T_m$ of the propylene-based rubbery copolymer may be less than 110° C., preferably less than 90° C., more preferably less than 80° C., and most preferably less than 70° C.; in these or other embodiments, the propylene-based rubbery copolymer may also be substantially or entirely amorphous with no melting point.

In one or more embodiments, the propylene-based rubbery copolymer may be characterized by a heat of fusion (Hf), as determined according to DSC procedures according to ASTM E 793. This may be determined by placing 6 to 10 mg of sample into DSC equipment and heating the sample at about 10° C./min. The propylene-based rubbery copolymer may be characterized by a heat of fusion that is less than 7.0 J/g, preferably less than 6.0 J/g, more preferably less than 5.0

J/g, more preferably less than 3.0 J/g, more preferably less than 2.0 J/g, even more preferably less than 1.5 J/g, and most preferably less than 1.5 J/g.

The propylene-based rubbery copolymer may have a % crystallinity of from 0% to 40%, preferably 0% to 30%, more preferably 0% to 25%. Crystallinity may be determined according to DSC procedures in accordance with ASTM E-794-95. This may be determined by placing 6 to 10 mg of sample into DSC equipment and heating the sample at about 10° C./min. For use herein, the crystallinity of the propylene-alphe-olefin polymer can also be expressed in terms of percentage of crystallinity. The thermal energy for the highest order of polypropylene is estimated at 209 J/g (i.e., 100% crystallinity is equal to 209 J/g). Preferably, the propylene-ethylene polymer may have a crystallinity of less than about 40%, more preferably of less than about 25%, even more preferably from about 0.5% to about 22%, and most preferably from about 0% to about 20%.

The propylene-based rubbery copolymer preferably has a density of about 0.85 g/cc to about 0.92 g/cc, preferably about 0.87 g/cc to 0.90 g/cc, and more preferably from about 0.88 g/cc to about 0.89 g/cc at room temperature as measured per the ASTM D-792 test method.

In one or more embodiments, the propylene-based rubbery copolymer can have a melt flow rate (MFR), as measured according to the ASTM D-1238, condition E, 2.16 kg weight @ 230° C., equal to or greater than 0.2 dg/min, preferably at least 0.5 dg/min, and more preferably at least 1.0 dg/min. In these or other embodiments, the melt flow rate may also be equal to or less than 350 dg/min, preferably equal to or less than 100 dg/min, more preferably less than 50 dg/min. A preferred range for the MFR is from 0.5 dg/min to 350 dg/min, and more preferably from 2 dg/min to 30 dg/min.

Furthermore, the propylene-based rubbery copolymers used herein may have a Mooney viscosity [ML (1+4) @ 125° C.], as determined according to ASTM D-1646, of less than 500, preferably 150, more preferably less than 100, even more preferably less than 75, and most preferably less than 50. A preferred range for the Mooney viscosity in all aspect of the present invention in case the rubber is a copolymer of ethylene, propylene and optionally a diene is from about 10 to about 500.

The propylene-based rubbery copolymer used herein can have an $M_w$ of about 5,000 to about 5,000,000 g/mole, preferably an $M_w$ of about 10,000 to about 1,000,000 g/mole, more preferably an $M_w$ of about 20,000 to about 500,000, g/mole and most preferably an $M_w$ of about 50,000 to about 400,000 g/mole.

The propylene-based rubbery copolymer can have an $M_n$ of about 2,500 to about 2,500,000 g/mole, preferably an $M_n$ of about 5,000 to about 500,000 g/mole, more preferably an $M_n$ of about 10,000 to about 250,000 g/mole, and most preferably a $M_n$ of about 25,000 to about 200,000 g/mole.

The propylene-based rubbery copolymer can have a Z-average molecular weight ($M_z$) of about 10,000 to about 7,000,000 g/mole, preferably an $M_z$ of about 50,000 to about 1,000,000 g/mole, more preferably an $M_z$ of about 80,000 to about 700,000 g/mole, and most preferably an $M_z$ of about 100,000 to about 500,000 g/mole.

The molecular weight distribution (MWD=$(M_w/M_n)$) of the propylene-based rubbery copolymer used in the present invention may be 1 to 40, preferably 1.5 to 20, more preferably 1 to 5, even more preferably 1.8 to 5, and most preferably 1.8 to 3.

The propylene-based rubbery copolymer may be manufactured or synthesized by using a variety of techniques. For example, these copolymers can be synthesized by employing solution, slurry, or gas phase polymerization techniques that employ various catalyst systems including Ziegler-Natta systems, including vanadium catalysts. Exemplary catalysts also include single-site catalysts including constrained geometry catalysts and Group IV-VI metallocenes, as well as Brookhart catalysts. Such copolymers are commercially available, e.g. under the tradenames Vistalon™ (ExxonMobil Chemical Co.; Houston, Tex.), Keltan™ (DSM Copolymers; Baton Rouge, La.), Nordel™ IP (DuPont Dow Elastomers; Wilmington, Del.), Nordel MG™ (DuPont Dow Elastomers), Royalene™ (Chemtura) and Buna™ (Lanxess).

Finally, the propylene-based rubbery copolymer can be oil extended from 0 to 100 phr (per hundred rubber), either in the polymerization step or post polymerization. The type of extension oil can be one or several of those mentioned below in the blend composition.

A preferred propylene-based rubbery copolymer for use in all aspects of the present invention is an ethylene/propylene/optionally diene terpolymer, having a density of from about 0.87 to about 0.90, an MFR of from about 2 to about 30, and a Mooney viscosity of from 10 to about 100.

Butyl Rubber

As mentioned above, butyl rubber can also be used as the rubber component in the compositions and the methods according to the present invention. Butyl rubber generally includes copolymers and terpolymers of isobutylene and at least one other comonomer. Useful comonomers include multiolefins, such as isoprene, vinyl aromatic monomers, alkyl substituted vinyl aromatic monomers, and mixtures thereof. Exemplary vinyl aromatic monomers include vinyl styrene. Exemplary alkyl substituted vinyl aromatic monomers include α-methyl styrene and paramethyl styrene (PMS). These copolymers and terpolymers may also be halogenated, such as in the case of chlorinated and brominated butyl rubber. These halogenated polymers may derive from monomers such as parabromomethylstyrene.

In one or more embodiments, butyl rubber includes copolymers of isobutylene and isoprene, copolymers of isobutylene and paramethyl styrene, terpolymers of isobutylene, isoprene, and divinyl styrene, branched butyl rubber, and brominated copolymers of isobutene and paramethylstyrene (yielding copolymers with parabromomethylstyrenyl mer units). These copolymers and terpolymers may be halogenated.

Where butyl rubber includes the isobutylene-isoprene copolymer, the copolymer may include from about 0.5 to about 30, preferably from about 0.8 to about 5, % by weight isoprene based on the entire weight of the copolymer with the remainder being isobutylene.

Where butyl rubber includes isobutylene-paramethyl styrene copolymer, the copolymer may include from about 0.5 to about 25, preferably from about 2 to about 20, % by weight paramethyl styrene, based on the entire weight of the copolymer with the remainder being isobutylene. In one embodiment, isobutylene-paramethyl styrene copolymers can be halogenated, such as with bromine or chlorine, and these halogenated copolymers can contain from about 0 to about 10 percent by weight, preferably from about 0.3 to about 7% by weight halogenation.

Where butyl rubber includes isobutylene-isoprene-divinyl styrene terpolymer, said terpolymer may include from about 95 to about 99, preferably from about 96 to about 98.5, % by weight isobutylene, and from about 0.5 to about 5, preferably from about 0.8 to about 2.5, % by weight isoprene, based on the entire weight of the terpolymer, with the balance being divinyl styrene.

In the case of halogenated butyl rubbers, the butyl rubber may include from about 0.1 to about 10, preferably from about 0.3 to about 7, more preferably from about 0.5 to about 3% by weight halogen, based upon the entire weight of the copolymer or terpolymer.

The $T_g$ of butyl rubber useful in the present invention as explained above can be less than about −55° C., preferably less than about −58° C., more preferably less than about −60° C., most preferably less than about −63° C.

The Mooney viscosity ($ML_{1+8}$ @ 125° C.) of butyl rubber useful in the present invention as explained above can be from about 25 to about 75, preferably from about 30 to about 60, and more preferably from about 40 to about 55.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethyl styrene are available under the tradename Exxpro™ (ExxonMobil Chemical Co.), star branched butyl rubbers are available under the tradename Star Branched Butyl™ (ExxonMobil Chemical Co.), and copolymers containing parabromomethylstyrenyl mer units are available under the tradename Exxpro™ 3745 (ExxonMobil Chemical Co.). Halogenated and non-halogenated terpolymers of isobutylene, isoprene, and divinyl styrene are also available under the tradename Polysar Butyl™ (Lanxess; Germany).

Peroxide

Peroxides useful in the compositions of the present invention are generally selected from organic peroxides. Examples of organic peroxides include, but are not limited to, di-tert-butyl peroxide, dicumyl peroxide, t-butylcumyl peroxide, α,α-bis(tert-butylperoxy)diisopropyl benzene, 2,5 dimethyl 2,5-di(t-butylperoxy)hexane, 1,1-di(t-butylperoxy)-3,3,5-trimethyl cyclohexane, benzoyl peroxide, lauroyl peroxide, dilauroyl peroxide, and mixtures thereof. Also, diaryl peroxides, ketone peroxides, peroxydicarbonates, peroxyesters, dialkyl peroxides, hydroperoxides, peroxyketals and mixtures thereof may be used. 2,5-Dimethyl-2,5-di(tert-butylperoxy)hexane (DHBP) is a preferred organic peroxide for use in all aspects of the present invention.

The peroxide in the present invention does not (primarily) act as a curing agent. The amount of peroxide, if used in the compositions of the present invention, is very low, i.e., of from about 0.05 to about 2.0 wt %, preferably of from about 0.1 to about 1.5 wt %, more preferably of from about 0.25 to about 1.35 wt %, and most preferably from about 0.5 to about 1.25 wt %, based on the total weight of the composition. These amounts apply to the initial composition. Instead of or in combination with the peroxide, other rheology-modifying (curative) agents may be used in the present invention, such as other free radical initiators, e.g. azo initiators.

The compositions of the present invention are substantially free, preferably entirely free, of co-agents typically employed in combination with peroxides curatives. Preferably, such co-agents are absent from the present compositions. Co-agents (or "co-curative agents"), which are substantially absent, preferably absent, from the compositions of the present invention, include compounds such as triallylcyanurate, multi-functional acrylates or multi-functional methacrylates or other co-agents, e.g. high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylates, multi-functional methacrylates, or oximers such as quinone dioxime.

Even though co-agent is substantially or entirely absent from the compositions of the present invention, a certain (low) amount of cross-linking of the ethylene alpha-olefin plastomer or rubber phase can be present, depending on the amount of peroxide. If there is gel formation, the gel level should be below 30 weight %, preferably below 20 weight %, and most preferably below 10 weight %, based on the total weight of ethylene alpha-olefin plastomer or the rubber.

Scratch Resistance Improving Additive

Any of the compositions of all aspects of the present invention may additionally contain at least one scratch resistance improving additive. Preferably, this scratch resistance improving additive comprises a polymer. Preferred examples for such scratch resistance improving polymers are high molecular weight silicone rubbers, such as polysiloxanes. Through control of reaction thermodynamics and kinetics, siloxanes with different degrees of polymerization and thus different molecular weights and viscosities can be manufactured. Molecular weights can range from a few hundred to several hundred thousands, with corresponding viscosities of 1 to several million $mm^2/s$. Polysiloxanes, especially polydimethylsiloxanes, are the preferred scratch resistance improvers according to the present invention. The molecular weights of the polysiloxanes are at least about 50,000, preferably at least about 100,000, and more preferably at least about 200,000. The viscosities of the polysiloxanes are at least about 10,000 $mm^2/s$, preferably at least about 100,000 $mm^2/s$, more preferably at least about 1,000,000 $mm^2/s$. The polysiloxanes may be used as pure materials or mixed via extrusion with various thermoplastics. The ultra-high molecular weight, ultra-high viscosity polysiloxanes are solid, pellet form blends of a thermoplastic polymer and 25 to 50 weight % of the polysiloxane. Examples for such polysiloxane masterbatches are commercially available products, such as silicon masterbatches, e.g. MB50 available from Dow Corning, e.g. MB50-0002 or MB50-321.

In one or more embodiments, the scratch resistance improving additive can also be a functionalized polyolefin like maleic anhydride or acrylic acid grafted polypropylene or/and maleic anhydride grafted polyethylene.

In one or more embodiments, scratch resistance improving additive can also be a polyolefin-silicone copolymer (the olefin units being derived from ethylene and/or propylene) made either by grafting of silicone groups to polyolefin or by reactor copolymerization of propylene or/and ethylene with vinyl silanes.

Also, any of the fillers mentioned below under "Other Constituents of the Composition" increase the scratch resistance of the polymer compositions of the present invention, and may thus also be used as the "scratch resistance improving additive" in the context of the present invention.

Other Constituents of the Composition

In one or more embodiments, the compositions of the present invention may include a mineral oil, a synthetic oil, or a combination thereof. These oils may also be referred to as plasticizers, extenders or process oils. The addition of process oil may lower the viscosity and increase flexibility of the composition while improving the properties of the composition at temperatures near and below 0° C. It is believed that these benefits arise by the lowering of the Tg of the composition. Additional benefits may include improved processability and a better balance of elastic and tensile strength.

Mineral or synthetic oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 g/mole to about 9,000 g/mole, and preferably from about 700 g/mole to about 1,300 g/mole. In one or more embodiments, these oligomers include isobutenyl mer units. Exemplary synthetic oils include polyisobutylene, poly(isobutylene-co-butene), polybutadiene, poly(butadiene-co-butene), and mixtures thereof. In one or more embodiments, synthetic oils may include polylinear $\alpha$-olefins, poly-branched $\alpha$-olefins, hydrogenated polyalphaolefins, and mixtures thereof.

The synthetic oils include synthetic polymers or copolymers having a viscosity in excess of about 20 cp, preferably in excess of about 100 cp, and more preferably in excess of about 190 cp, where the viscosity is measured by a Brookfield viscometer according to ASTM D-4402 at 38° C. In these or other embodiments, the viscosity of these oils can also be less than 4,000 cp and preferably less than 1,000 cp.

The oil may also be a synthetic poly-alpha-olefinic (PAO) oil with a viscosity of from 5 to 500 Centistoke at 40° C. as described for example in WO 2004/14988. The polyalphaolefin (PAO) may be a liquid with a number-average carbon number of 20 to 1500, preferably 35 to 400, more preferably 40 to 250. The PAO may comprise (linear) oligomers of $C_5$ to $C_{24}$ (preferably $C_6$ to $C_{18}$, preferably $C_6$ to $C_{14}$, preferably $C_8$ to $C_{12}$) alpha-olefins. Particularly preferred are oligomers of 1-octene, 1-decene, and/or 1-dodecene. Most preferred are oligomers of 1-decene.

The PAO may comprise oligomers of a single or of mixed alpha-olefins as described above. The PAO may comprise oligomers of mixed alpha-olefins (i.e., involving two or more alpha-olefins) where the weighted average number for all the alpha-olefins is between 6 and 14 (preferably between 8 and 12, more preferably between 9 and 11) carbons. The PAO may comprise oligomers of linear alpha-olefins having 5 to 18 carbon atoms, more preferably 6 to 12 carbon atoms, and most preferably 10 carbon atoms, having a kinematic viscosity (KV) at 100° C. of 3 cSt or more, preferably 8 cSt or more, most preferably 10 cSt or more (as measured by ASTM D445); and preferably having a viscosity index (VI) of 100 or more, more preferably 130 or more, and most preferably 150 or more (as determined by ASTM D2270); and/or having a pour point of $-10°$ C. or less, more preferably $-20°$ C. or less, and most preferably $-50°$ C. or less (as determined by ASTM D97). Preferred PAOs are described more particularly in, for example, U.S. Pat. No. 5,171,908, and U.S. Pat. No. 5,783,531 and in Synthetic Lubricants and High-Performance Functional Fluids 1-52 (Leslie R. Rudnick & Ronald L. Shubkin, ed. Marcel Dekker, Inc. 1999). Desirable PAOs are commercially available as SpectraSyn™ and SpectraSyn Ultra™ from ExxonMobil Chemical in Houston, Tex. (previously sold under the SHF and SuperSyn™ tradenames by ExxonMobil Chemical Company). Other useful PAOs include those sold under the tradenames Synfluid™ available from ChevronPhillips Chemical Company (Pasedena, Tex.), Durasyn™ available from Innovene (Chicago, Ill.), Nexbase™ available from Neste Oil (Keilaniemi, Finland), and Synton™ available from Chemtura Corporation (Middlebury, Conn.). Particularly preferred PAOs for use herein are those having a) a flash point of 200° C. or more; and b) a pour point less than $-20°$ C. and/or a kinematic viscosity at 100° C. of 10 cSt or more.

Other useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Sartomer).

In one or more embodiments, the extender oils may also include organic esters, alkyl ethers, or combinations thereof. The organic esters and alkyl ethers may have a molecular weight that is generally less than about 10,000. Preferably, suitable esters include monomeric and oligomeric materials having an average molecular weight of below about 2,000 and more preferably below about 600. The esters may be compatible or miscible with both the ethylene alpha-olefin plastomer and the rubber components of the composition of the present invention; i.e., they may mix with other components to form a single phase. The esters may include aliphatic mono- or diesters, or alternatively oligomeric aliphatic esters or alkyl ether esters. The compositions may be devoid of polymeric aliphatic esters and aromatic esters, as well as phosphate esters.

In certain embodiments, the compositions of the invention may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers.

The compositions of the present invention may include 0 to 35 weight %, preferably 2 to 30 weight %, more preferably 5 to 25 weight %, and most preferably 10 to 20 weight % of extender or process oil, based upon the total weight of the composition. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable.

Fillers, such as clay, nano-clay, exfoliated clay, kaolin, silica, talc, mica, wollastonite, barium sulfate, or calcium carbonate; fibers, such as carbon or glass fibers, or pigments, such as carbon black, titanium dioxide or zinc oxide and the like may be added in amount of at least 0.5 wt %, preferably from 1 to 50 wt %, more preferably from 5 to 35 wt %, and most preferably from 10 to 30 wt %, based on the total weight of the composition. The inorganic fillers may include particles less than 1 mm in diameter, rods less than 1 cm in length, and plates less than 0.2 $cm^2$ in surface area. The addition of very small particulate fillers, commonly referred to as nano-composites, is also contemplated. The inorganic fillers may be coated by a coating agent like silane derivatives or other agents in order to improve their dispersion in the polymer composition. All the fillers listed in this paragraph may also be referred to in the context of the present invention as the scratch resistance improving additive and may be used accordingly.

Nucleating or crystallization inducing or enhancing agents (also referred to as clarity enhancing agents) may also be added to the compositions of the present invention. An example of such nucleating agents is Hyperform HRN-68™, available from Milliken Chemical.

Adding antioxidant, UV stabilizer and/or UV absorber to the compositions described herein may improve the long term ageing. Such additives are available commercially. Examples of antioxidants include, but are not limited to, quinolein, e.g., trimethylhydroxyquinolein (TMQ); imidazole, e.g., zinc mercapto toluyl imidazole (ZMTI); and conventional antioxidants, such as hindered phenols, lactones, and phosphites. One example of suitable antioxidants is Irganox 1010 or 1076™. As UV stabilizer package, one or several well known UV stabilizers alone or combined with one or several additives known as UV absorber can be used.

The compositions of this invention may further optionally include at least one of additional lubricants, anti-blocking agents, anti-static agents, waxes, foaming agents, flame retardants, tack improving additives or adhesion promoters and other additives known in the compounding art.

Amounts

The individual constituents can be present in the compositions in all aspects of the present invention in the following amounts: The thermoplastic resin may be present in 10 to 60 weight %, preferably 20 to 50 weight %, more preferably 30 to 45 weight %, based upon the total weight of the composition. The ethylene alpha-olefin plastomer may be present in 15 to 70 weight %, preferably in 25 to 60 weight %, more preferably in 30 to 50 weight %, based upon the total weight of the composition. The rubber may be present in 15 to 70 weight %, preferably in 25 to 60 weight %, more preferably in 30 to 50 weight %, based upon the total weight of the composition. The peroxide, if used, may be contained in 0.05 to 2.0 weight %, preferably 0.5 to 1.25 weight %, more preferably 0.75 to 1.2 weight %, based upon the total weight of the composition. A scratch resistant additive, if present, may be contained in 0 to 25 weight %, preferably 0 to 15 weight %, more preferably 0 to 12 weight %, and even more preferably 1 to 10 weight %, most preferably 1.5 to 7.5 weight %, based upon the total weight of the composition.

Preferred Embodiment

A preferred composition according to the present invention comprises, as thermoplastic resin, a propylene-based homo- or copolymer having an MFR of greater than 70 dg/min in 10 to 60 weight %, based upon the total weight of the composition; as an ethylene alpha-olefin plastomer an ethylene alpha-olefin copolymer having an MFR of from 2 to 30 dg/min, a density of from 0.87 to 0.90 g/cc, and a Mooney viscosity of from 10 to 100, in 15 to 70 weight %, based upon the total weight of the composition; a polysiloxane as a scratch resistance improving additive in 0 to 15 weight %, based upon the total weight of the composition; and a peroxide in an amount of 0.5 to 1.25 wt %, based on the total weight of the composition. A VW K09 grained shaped article made of such composition exhibits a surface gloss change after 96 hours at 120° C. of less than 2.0, as determined in accordance with ASTM D523 at an angle of 60°.

Another preferred composition according to the present invention comprises, as thermoplastic resin, a propylene-based homo- or copolymer having an MFR of greater than 70 dg/min, in 10 to 60 weight %, based upon the total weight of the composition; as the rubber a copolymer of ethylene, propylene and optionally a diene in 15 to 70 weight %, based upon the total weight of the composition; a polysiloxane as a scratch resistance improving additive in 0 to 15 weight %, based upon the total weight of the composition; and a peroxide in an amount of 0.5 to 1.25 wt %, based on the total weight of the composition. A VW K09 grained shaped article made of such composition also exhibits a surface gloss change after 96 hours at 120° C. of less than 2.0, as determined in accordance with ASTM D523 at an angle of 60°.

Shaped Article

The present invention also relates to shaped articles (or shaped parts) formed from any of the compositions disclosed above, and made by the methods of the present invention.

In certain embodiments of the present invention, the shaped articles may be automotive exterior trim pieces, automotive interior trim pieces, instrument panels, bumper fascia or door panels. The polymer compositions of the present invention are particularly suitable as soft overmolding skins (e.g. on a polypropylene substrate) in the interior of cars, such as automotive door or instrument panels etc.

In certain embodiments, the shaped articles made of the compositions of the present invention are formed by thermoforming, blow molding, injection molding, compression molding or injection-compression molding. The compositions of the present invention are particularly suited for injection molding due to their low shear viscosities. Therefore, injection molding is the preferred way of processing the compositions of the present invention to form them into shaped articles. The shaped articles may be further modified by surface graining For example, a finished shaped article made of a composition of the present invention may have a grained surface such as a VW K09 grained surface as explained above.

The shaped articles of the present invention exhibit a reduced surface gloss change upon heat ageing as compared to conventional shaped articles. The most sensitive method to judge whether or not the surface changes in gloss (either increased or decreased gloss) is by visual evaluation, in particular when the surface is grained, such as by an industry standard graining pattern (e.g. VW K09 grained as described hereinabove). However, gloss change can also be determined in accordance with ASTM D523 (such as with ASTM D523-89) on a VW K09 grained 2 mm plaque, using a highly polished black glass standard. The shaped articles of the present invention, comprising the compositions of the present invention, exhibit a gloss change (at an angle of 60°, average of three measurements) after heat ageing at 120° C. for 96 hours of less than 2.0, preferably less than 1.5, more preferably less than 1.0 and even more preferably less than 0.5.

The shaped articles of the present invention made from the compositions of the present invention also exhibit a high scratch resistance. The scratch resistance is determined in accordance with ISO 4586-0, again on a VW K09 grained 2 mm plaque. A rating of 5 in this test means "no lines visual at any force applied"; a rating of 4 means "lines only visual at applied force of 6 N"; a rating of 3 means "lines only visual at applied force of 4 and 6 N"; a rating of 2 means "lines only visual at applied force of 2, 4 and 6 N", and a rating of 1 means "lines visual at all applied forces (1, 2, 4 and 6 N)". Ratings of at least 3.5, preferably at least 4.0, more preferably at least 4.5 are considered satisfactory for the purposes of the present invention. The shaped articles of the present invention made from the compositions as defined above exhibit ratings of at least 3.5 and no sticky surface after heat aging (96 hours at 120° C.) in this test. They also have a soft feel.

Preparation of the Composition

The composition can be prepared or compounded by any convenient method, such as by blending of the thermoplastic resin and the ethylene alpha-olefin plastomer or the rubber, and the peroxide, if present, as well as any optional further additives listed above, either directly, e.g., in an extruder, such the the same extruder used to make the finished product, or by pre-melt mixing in a separate mixer or extruder (for example, a Banbury mixer). If blended in an extruder, the finished composition is extruded and may be formed, e.g., into pellets or immediately into the desired shaped article.

Examples of machinery capable of generating the shear and mixing include extruders with kneaders or mixing elements with one or more mixing tips or flights, extruders with one or more screws, planetary extruder, single screw extruder, co-rotating multi-screw screw extruder, counter rotating multi-screw extruder, co-rotating intermeshing extruder or ring extruder, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 rpm). The peroxide, if used, as well as any further optional additives as listed above, can be introduced into the composition at the same time as the thermoplastic resin and the ethylene alpha-olefin plastomer or the rubber, or later downstream in case of using an extruder or Buss kneader, or only later in time. Any of the constituents of the composition can be added in one addition step or in several addition steps. The scratch resistance improving additive and optional further additives can be added in pure form or in the form of masterbatches as commercially available. When a single or twin screw extruder is used as melt mixer, one or more ingredients can be added using a side extruder.

The composition can either be a physical blend or an in-reactor blend manufactured by in-reactor processes as known to those of ordinary skill in the art. The in-reactor blend preferably is made using a series or parallel solution polymerization processes as known to those of ordinary skill in the art.

Method for Reducing Gloss Change Upon Heat Ageing

In an embodiment, the present invention provides a method of reducing surface gloss change after heat ageing in a shaped article made of a composition comprising a thermoplastic resin and an ethylene alpha-olefin plastomer, and/or of reducing the shear viscosity of such composition, the method comprising adding to the composition a peroxide in an amount of 0.05 to 2.0 wt %, based on the total weight of the composition. In a preferred embodiment of this method, the composition is kept substantially free of any co-agent as defined hereinabove.

In another embodiment, the present invention provides a method of reducing the shear viscosity of a composition comprising a thermoplastic resin and a rubber, and/or of reducing surface gloss change after heat ageing in a shaped article made of such composition, the method comprising adding to the composition a peroxide in an amount of 0.05 to 2.0 wt %, based on the total weight of the composition. In a preferred embodiment of this method, the composition is kept substantially free of any co-agent as defined hereinabove.

Further constituents of the composition in the two above-described methods (e.g., scratch resistance improving additive and further, optional additives) are as described elsewhere herein. In the context of the two above-described method, shaped articles made of some of the compositions exhibit reduced surface gloss change upon heat ageing. In particular, in some embodiments of the present invention the surface gloss change in a VW K09 grained shaped article made of a composition comprising a thermoplastic resin and an ethylene alpha-olefin plastomer or a rubber (preferably, an ethylene alpha-olefin plastomer) after 96 hours at 120° C. is reduced to less than 2.0, preferably to less than 1.5, and even more preferably to less than 1.0, as determined in accordance with ASTM D523 at an angle of 60°. In some embodiments of the above-described methods of the present invention, the composition comprising a thermoplastic resin and an ethylene alpha-olefin plastomer or a rubber (preferably, a rubber) exhibit a reduced shear viscosity, especially at high shear. This is beneficial in the case these compositions are used in injection molding. In particular, the ratio of the shear viscosity at a shear rate of 500/s to the shear viscosity at a shear rate of 2500/s may be at least 2.0, preferably at least 2.2, and more preferably at least 2.4. Finally, in some embodiments the above-described methods also increase the tensile strength (as determined in accordance with ISO 37) of compositions comprising a thermoplastic resin and a rubber or an ethylene alpha-olefin plastomer (preferably, a rubber).

Method for Injection Molding

The present invention also relates to an injection molding process, wherein any of the compositions according to the present invention, as described above or as prepared by the methods of the present invention as described above, are melted in an extruder and injection molded according to methods known in the art. The injection molding process can also be a sequential process, wherein two or more compositions are sequentially injected into a mold having two or more inlets. In a first injection step a core part or substrate is formed, e.g. of polypropylene. This substrate or core is then overmolded with one of the compositions according to the present invention. Also, the compositions of the present invention may be injected at several injection points into the mold. Due to the good flowability of the compositions of the present invention, no welding lines are encountered where material from different injection points flows together. Due to their low shear viscosity, the compositions of the present invention are particularly useful for injection molding applications.

Method of Making a Shaped Article

The present invention also provides for a method of making a shaped article. In certain embodiments, the shaped article of the method herein described is formed by thermoforming, blow molding, injection molding as described above, compression molding or injection-compression molding the compositions according to the other aspects of the present invention. Injection molding is preferred. The shaped articles may optionally be further modified by surface treatment, such as by surface graining, in order to obtain a grained surface, e.g. a VW K09 grained surface as explained above. The shaped articles may be (or may be comprised in) automotive exterior trim pieces, automotive interior trim pieces, instrument panels, bumper fascia or door panels.

The invention also includes the following embodiments A-BB:

A. A composition comprising:
   a thermoplastic resin;
   an ethylene alpha-olefin plastomers; and
   from about 0.05 to about 2.0 wt%, based on the total weight of the composition, of a peroxide,
   wherein the composition is substantially free of any co-agent.

B. The composition of embodiment A, wherein a VW K09 grained shaped article made of the composition exhibits a surface gloss change after 96 hours at 120° C. of less than 2.0, as determined in accordance with ASTM D523 at an angle of 60°.

C. A method of preparing the composition of embodiment A, comprising the step of melt blending the thermoplastic resin, the ethylene alpha-olefin plastomer, and the peroxide in an amount of from about 0.05 to about 2.0 wt %, based on the total weight of the composition, wherein the composition is substantially free of any co-agent.
D. A method of reducing surface gloss change after heat ageing of a shaped article made of a composition comprising a thermoplastic resin and an ethylene alpha-olefin plastomer, and/or of reducing the shear viscosity of said composition, the method comprising adding to the composition a peroxide in an amount of 0.05 to 2.0 wt %, based on the total weight of the composition.
E. A polymer composition comprising:
a thermoplastic resin;
a rubber; and
optionally, from about 0.05 to about 2.0 wt %, based on the total weight of the composition, of a peroxide,
wherein the composition is substantially free of any co-agent.
F. The polymer composition of embodiment E, wherein a VW K09 grained shaped article made of the composition exhibits a surface gloss change after 96 hours at 120° C. of less than 2.0, as determined in accordance with ASTM D523 at an angle of 60°.
G. A method of preparing the composition of embodiment E, comprising the step of melt blending the thermoplastic resin, the rubber, and optionally the peroxide in an amount of from about 0.05 to about 2.0 wt %, based on the total weight of the composition, wherein the composition is substantially free of any co-agent.
H. A method of reducing the shear viscosity of a composition comprising a thermoplastic resin and a rubber, and/or reducing surface gloss change after heat ageing of a shaped article made of said composition, the method comprising adding to the composition a peroxide in an amount of 0.05 to 2.0 wt %, based on the total weight of the composition.
I. The composition or method of any of embodiments A to D, wherein the ethylene alpha-olefin plastomer in the composition is a copolymer comprising ethylene and one or more of the group consisting of 1-octene, 1-hexene and 1-butene units.
J. The composition or method of any of embodiments A to D or I, wherein the ethylene alpha-olefin plastomer in the composition has a density of less than about 0.88 g/cc and/or an MFR of from about 0.3 to about 50 and/or a molecular weight distribution of 1.5 to 4.
K. The composition or method of any of embodiments E to G, wherein the rubber in the composition is a copolymer of ethylene, propylene and optionally a diene, and the diene, if present, is contained in the copolymer in 0 to 10 wt %, based on the total weight of ethylene, propylene and diene units.
L. The composition or method of embodiment K, wherein the copolymer of ethylene, propylene and optionally a diene has a Mooney viscosity of from about 10 to about 500 and/or a molecular weight distribution of 1.5 to 20.
M. The composition or method according to any of the preceding embodiments, wherein the thermoplastic resin is a propylene homopolymer, propylene random copolymer or propylene impact copolymer.
N. The composition or method according to any of the preceding embodiments, wherein the thermoplastic resin is a propylene-based polymer having an MFR of from about 100 to about 3000 dg/min and/or a Tm of from about 155 to about 170° C.
O. The composition or method according to any of the preceding embodiments, wherein the amount of the peroxide, if present, is from about 0.5 to about 1.25 wt %, based on the total weight of the composition.
P. The composition or method according to any of the preceding embodiments, wherein the peroxide, if present, is 2,5-dimethyl-2,5-di(tert-butylperoxy)hexane (DHBP).
Q. The composition or method according to any of the preceding embodiments, wherein the composition additionally comprises a scratch resistance improving additive, preferably in an amount of from 1 to 10 wt %, based on the total weight of the composition.
R. The composition or method according to embodiment Q, wherein the scratch resistance improving additive comprises a polysiloxane.
S. The method of reducing surface gloss change according to embodiments D or H, wherein the surface gloss change of a VW K09 grained shaped article made of the composition is less than 2.0 after 96 hours at 120° C., as determined in accordance with ASTM D523 at an angle of 60°.
T. The method of embodiments C or G, wherein the thermoplastic resin is first melt blended with the ethylene alpha-olefin plastomer or the rubber, and the peroxide, if present, as well as additional components, if present, are subsequently added to the polymer melt blend.
U. The method of embodiments C, G, or T, wherein the melt blending is performed in an extruder, and the composition is extruded to form an extrudate, which is optionally formed into pellets.
V. A composition prepared by the method of any of embodiments C, G, T, or U.
W. An injection molding process comprising melting a composition according to any of embodiments A, B, E, F, I, S, or V in an extruder, and injection molding the composition.
X. The process of embodiment W comprising the sequential injection of two or more compositions into a single mold having two or more inlets, wherein in a first injection step a core part is formed and in a second injection step the core part is overmolded with the composition according to any of embodiments A, B, E, F, I, S, or V.
Y The process of embodiment X, wherein the core part comprises polypropylene.
Z. A method of making a shaped article, the method comprising the injection molding process according to any of embodiments W to Y, and optionally comprising graining the surface of the shaped article.
AA. A shaped article comprising the composition of any of embodiments A, B, E, F, I, S, or V.
BB. An automotive interior component comprising a shaped article according to embodiment AA.

The above description is intended to be illustrative of the invention, but should not be considered limiting. Persons skilled in the art will recognize that various modifications may be made without departing from the spirit and scope of the invention. Accordingly, the invention will be deemed to include all such modifications that fall within the appended claims and their equivalents.

EXAMPLES

All the examples were prepared within a 1.6 liter internal mixer (Banbury Farrel) according to formulations 1 to 18 shown in the following Tables. The set temperature of the mixer was 180 to 220° C. The polymers, mineral fillers, stabilizer package, scratch improving additive, nucleating agent and color master batch were added to the mixer and mixed for 3 minutes before adding process oil when used.

Mixing was continued 2 minutes, and then the peroxide, if it was present, was added. Mixing was continued for another 2 minutes before dumping the melt. A sheet was made out of the melt on a calendar followed by granulation. The granules were injection molded to produce the ISO plaques of 150 mm length, 100 mm width and 2 mm thickness. Testing dumbbells were prepared from the non-grained injection molded plaques. They were grained according to the industry standard VW K09.

The polymer compositions of the examples 1-4 comprise a blend of a high-flow propylene homopolymer (Borflow™ HL 512 FB, available from Borealis), a plastomer (Exact™ 5361 available from ExxonMobil Chemical Company; in examples 1 and 2) or rubber (Vistalon™ 3702, available from Exxon-Mobil Chemical Company; in examples 3 and 4), a polysiloxane masterbatch (MB 50-0002, available from Dow Corning), a pigment masterbatch (Grafecolor MB M5221-GR, available from Grafe), a nucleating agent (Hyperform™ HPN 68 L, available from Milliken Chemical), a peroxide (DHBP-45-IC1, available from Degussa; only in examples 1 and 3, while examples 2 and 4 do not contain peroxide), a paraffinic process oil (Paralux™ 6001, available from Chevron), and an antioxidant (Irganox™ B 225, available from Ciba-Geigy. Example 2 is comparative. The test results are shown in Tables 1a to 1c.

TABLE 1c

| | | | VW K09 grained, 2 mm plaque | | |
|---|---|---|---|---|---|
| | | 1 | 2 (compar.) | 3 | 4 |
| Physical aspects after 17.5 hr/120° C. | | | | | |
| Delta gloss [visual] | — 17.5 hr/ 120° C. | no | yes | no | no |
| Stickiness [when hot - touch] | — 17.5 hr/ 120° C. | no | very little | no | no |
| Physical aspects after 96 hr/120° C. | | | | | |
| Delta gloss [visual] | — 96 hr/ 120° C. | no | yes | no | no |
| Stickyness [when hot - touch] | — 96 hr/ 120° C. | no | no | no | no |

A gloss test in accordance with ASTM D523 was performed with the compositions of the examples 1 to 4, determining the gloss change of 2 mm VW k09 grained plaques (on the grained side) after heat ageing at 120° C., measuring at an angle of 60°, and taking the average of three measurements each. Sample preparation and measurement is performed as described herein above. The results are given in the following table 2. Again, example 2 is comparative.

TABLE 1a

| Formulation (in weight %) | | | 1 | 2 (compar.) | 3 | 4 |
|---|---|---|---|---|---|---|
| PP HL 512 FB | | | 32.5 | 33.0 | 32.5 | 33.0 |
| Exact 5361 (PX4A) | | | 43.9 | 44.4 | — | — |
| Vistalon 3702 | | | — | — | 43.9 | 44.4 |
| MB 50-0002 | | | 3.0 | 3.0 | 3.0 | 3.0 |
| Grafecolor MB M5221--GR | | | 4.0 | 4.0 | 4.0 | 4.0 |
| Hyperform HPN 68 L | | | 0.3 | 0.3 | 0.3 | 0.3 |
| DHBP-45-IC1 | | | 1.0 | — | 1.0 | — |
| Paralux 6001R | | | 15.0 | 15.0 | 15.0 | 15.0 |
| Irganox B 225 | | | 0.3 | 0.3 | 0.3 | 0.3 |

| Parameter | Method | Test Speed/ Conditions | Specimen/Size | | | | |
|---|---|---|---|---|---|---|---|
| Scratch Test [rating] | ISO 4586-02 | | VW K09 grained 2 mm plaque | 4 | 3 | 3-4 (or 3.5) | 5 |
| Hardness [ShD] | ISO 868 | 15 s delay | Piled of 3 disks of 2 mm /50 mm (thickness/diameter) | 26 | 28 | 30 | 27 |

TABLE 1b

| Properties @ RT | | Type 1 dumbbell, 2 mm ISO plaque | 1 Perpendicular/ Parallel to flow direction | 2 (compar.) Perpendicular/ Parallel to flow direction | 3 Perpendicular/ Parallel to flow direction | 4 Perpendicular/ Parallel to flow direction |
|---|---|---|---|---|---|---|
| Tensile Strength [MPa] | ISO 37 | 500 mm/min | 5.7/5.7 | 5.8/6.8 | 6.0/5.7 | 5.3/5.5 |
| Elongation at Break [%] | ISO 37 | 500 mm/min | 299/305 | 284/307 | 330/303 | 350/359 |
| Modulus@ 100% Strain [MPa] | ISO 37 | 500 mm/min | 5.4/5.4 | 5.7/6.7 | 5.3/5.2 | 5.0/5.2 |
| Properties Rheology: Capillary rheometer shear rate (1/s), [Pa · s] | EVTE 2041 | 230° C. - die 30/1 Pellets | | | | |
| | | 500 | 56 | 47 | 67 | 99 |
| | | 2500 | 27 | 24 | 27 | 39 |
| | | 10000 | 13 | 11 | 12 | 15 |

TABLE 2

| | angle | unaged | aged 17.5 h | delta 17.5 h | aged 96 h | delta 96 h |
|---|---|---|---|---|---|---|
| | | Grained, 120° C. | | | | |
| 1 | 60° | 1.7 | 2.3 | 0.6 | 2.5 | 0.8 |
| 2 (compar.) | 60° | 1.8 | 3.3 | 1.5 | 3.8 | 2.0 |
| 3 | 60° | 1.2 | 1.6 | 0.4 | 1.7 | 0.5 |
| 4 | 60° | 1.3 | 1.6 | 0.3 | 1.5 | 0.2 |

It can be seen from Tables 1a and 1b that the compositions according to the present invention exhibit good shear sensitivity, a good scratch resistance, acceptable hardness and good tensile properties. From Table 1c it is evident that the addition of a low amount of peroxide (from about 0.05 to about 2.0 wt %, based on the total weight of the composition) to a composition comprising a thermoplastic resin and an ethylene alpha-olefin plastomer reduces the surface gloss change after heat ageing and does not make the surface sticky (see example 1 and comparative example 2). In compositions comprising a thermoplastic resin and a rubber (see examples 3 and 4), low amounts of peroxide (again, from about 0.05 to about 2.0 wt %, based on the total weight of the composition) reduce the shear viscosity and improve the tensile strength. This is especially advantageous for injection molding and injection overmolding. Also these compositions exhibit low or now surface gloss change after heat ageing, and no surface stickiness.

The polymer compositions of examples 5 to 11 were prepared in the same way as described above for examples 1 to 4. They comprise a blend of a high-flow propylene homopolymer (Borflow™ HL 512 FB or HL 612 FB, available from Borealis), a plastomer (Exact™ 5361, 5371 or 8230 available from ExxonMobil Chemical Company), a polysiloxane masterbatch (MB 50-001, available from Dow Corning), a pigment masterbatch (Grafcolor MB M5221-GR, available from Grafe), a nucleating agent (Hyperform™ HPN 68 L, available from Milliken Chemical), a peroxide (DHBP-45-IC1, available from Degussa, a process oil (Primol™ 542, available from ExxonMobil Chemical Company), carbon black master batch from Cabot Plastic (PP 4045) and an antioxidant (Irganox™ B 225, available from Ciba-Geigy). See tables 3a to 3d.

The comparative polymer compositions of examples 12 to 18 comprise a blend of a high-flow propylene homopolymer (Borflow™ HL 512 FB or HL 612 FB, available from Borealis), a plastomer (Exact™ 5361, 5371 or 8230 available from ExxonMobil Chemical Company), a wollastonite filler (Nyglos™ M3, available from Nyco Minerals), a polysiloxane masterbatch (MB 50-001, available from Dow Corning), a pigment masterbatch (Grafcolor MB M5221-GR, available from Grafe), a nucleating agent (Hyperform™ HPN 68 L, available from Milliken Chemical), a free process oil (Primol™ 542, available from ExxonMobil Chemical Company), a further processing aid (Crodamid ER, available from Croda), an antioxidant (Irganox™ B 225, available from Ciba-Geigy), a and carbon black master batch from Cabot Plastic (PP 4045). Comparative examples 12 to 18 do not contain peroxide. See tables 4a to 4d.

The properties of the compositions and comparative compositions 5 to 18 are summarized in Tables 3a to 3d and Tables 4a to 4d. These tables show that the gloss change of shaped articles made of compositions comprising a thermoplastic resin and an ethylene alpha-olefin plastomer can be reduced by the addition of low amounts of peroxide (examples 5 to 11). The resulting compositions also have good scratch resistance, good hardness, and low viscosity at high shear rates. They are particularly suitable for automotive interior parts, such as side or instrument panels, which are made by sequential injection molding, and which must have an attractive appearance. The comparative compositions 12 to 18, which do not contain peroxide, do exhibit gloss change after heat ageing. They also have a higher shear viscosity.

TABLE 3a

| Formulation in weight % | no. | 5 | 6 | 7 | 8 | 9 | 10 | 11 |
|---|---|---|---|---|---|---|---|---|
| PP HL 612 FB | | | 35.04 | | 34.77 | 32.50 | 31.5 | 38.00 |
| PP HL 512 FB | | 39.36 | | 39.42 | | | | |
| Exact 5361 | (MFI = 0.5) | 37.82 | 42.14 | | 41.8 | 43.90 | 43.90 | 45.70 |
| Exact 5371 | (MFI = 5) | | | 37.88 | | | | |
| Exact 8230 | (MFI = 30) | | | | | | | |
| MB 50-001 | | 2.88 | 2.88 | 2.88 | 2.85 | 3.00 | 3.00 | 3.00 |
| Hyperform HPN 68 | | 0.29 | 0.29 | 0.29 | 0.29 | 0.30 | 0.30 | — |
| DHBP-45-IC1 | | 0.96 | 0.96 | 0.96 | 1.90 | 1.00 | 2.00 | 1.00 |
| Primol 542 | | 14.4 | 14.40 | 14.42 | 14.25 | 15.00 | 15.00 | 10.00 |
| Grafcolor MB M5221-GR | | 4 | 4.00 | 3.85 | 3.85 | 4.00 | 4.00 | — |
| Irganox B 225 | | 0.29 | 0.29 | 0.29 | 0.29 | 0.30 | 0.30 | 0.30 |
| PP 4045 | | | | | | | | 2.00 |
| Total | | 100.00 | 100.00 | 100.00 | 100.00 | 100.00 | 100.00 | 100.00 |

TABLE 3b

| Parameter | Method | Test Speed/ Conditions | Specimen Size | Units | 5 | 6 | 7 | 8 | 9 | 10 | 11 |
|---|---|---|---|---|---|---|---|---|---|---|---|
| Hardness | ISO 868 | 15 s delay | (thickness/ diameter) | Sh D | 35 | 29 | 36 | 29 | 29 | 30 | 26 |
| Scratch Test | ISO 4586-02 | | VW K09 grained 2 mm plaque | rating | 4 | 5 | 4 | 4.5 | 4 | 4-5 (or 4.5) | 4-5 (or 4.5) |

TABLE 3c

| Properties @ RT | | | | | 5 Perpendicular to flow/Flow Direction | 6 Perpendicular to flow/Flow Direction | 7 Perpendicular to flow/Flow Direction | 8 Perpendicular to flow/Flow Direction | 9 Perpendicular to flow/Flow Direction | 10 Perpendicular to flow/Flow Direction | 11 Perpendicular to flow/Flow Direction |
|---|---|---|---|---|---|---|---|---|---|---|---|
| Tensile Strength | ISO 37 | 500 mm/min | | MPa | 6.3/6.1 | 5.1/5.2 | 7.0/7.3 | 5.8/6.6 | 5.2/5.2 | 5.8/6.1 | 5.1/5.8 |
| Elongation at Break | ISO 37 | 500 mm/min | Type 1 dumbbell 2 mm ISO plaque | % | 246/238 | 250/219 | 161/157 | 302/285 | 331/311 | 417/410 | 206/307 |
| Modulus @ 100% Strain | ISO 37 | 500 mm/min | | MPa | 6.7/6.6 | 5.2/5.3 | 7.3/7.7 | 5.9/6.0 | 5.1/5.2 | 5.1/5.3 | 4.8/5.3 |
| Tear Strength | ISO 34-Ba | 500 mm/min | Angle/without nick 2 mm ISO plaque | kN/m | 52/51 | 42/42 | 42/45 | 43/44 | 47/46 | 48/49 | 56/48 |

TABLE 3d

| Properties: Capillary rheometer | TPE X0202 | 230° C.; L/D = 30/1 | | | 5 | 6 | 7 | 8 | 9 | 10 | 11 |
|---|---|---|---|---|---|---|---|---|---|---|---|
| shear rate (1/s) | | 500 | Pellets | [Pa·s] | 35 | 53 | 34 | 50 | 53 | 50 | — |
| | | 1000 | | | 28 | 38 | 25 | 36 | 39 | 35 | — |
| | | 2500 | | | 19 | 25 | 18 | 23 | 26 | 22 | — |
| | | 5000 | | | 14 | 18 | 13 | 16 | 18 | 16 | — |
| Gloss Change | — | after 16 hr/120° C. | VW K09 grained | visual | No | No | No | No | No | No | No |

TABLE 4a

| | | | (comparative examples) | | | | | |
|---|---|---|---|---|---|---|---|---|
| Formulation in weight % | | | 12 | 13 | 14 | 15 | 16 | 17 | 18 |
| PMP HL 612 FB | | | 24.42 | 21.54 | 21.54 | 30.4 | 28.82 | | |
| PP HL 512 FB | | | | | | | | 33.08 | 28.82 |
| Exact 5361 | (MFI = 0.5) | | | | | 47 | 50.98 | | 50.98 |
| Exact 5371 | (MFI = 5) | | 53.85 | | | | | 45.19 | |
| Exact 8230 | (MFI = 30) | | | 56.73 | 56.73 | | | | |
| Nyglos M3 | | | 4.80 | 4.81 | 9.62 | 5 | 9.80 | 4.81 | 9.80 |
| MB 50-001 | | | 2.88 | 2.88 | 2.88 | 3 | 2.94 | 2.88 | 2.94 |
| Hyperform HPN 68 | | | 0.29 | 0.29 | 0.29 | 0.3 | 0.29 | 0.29 | 0.29 |
| Primol 542 | | | 9.62 | 9.62 | 4.81 | 10 | 4.90 | 9.62 | 4.90 |
| Grafcolor MB M5221-GR | | | 3.85 | 3.85 | 3.85 | 4 | | | |
| Crodamid ER | | | | | | | | 3.85 | |
| Irganox B 225 | | | 0.29 | 0.29 | 0.29 | 0.3 | 0.29 | 0.29 | 0.29 |
| PP 4045 (CB MB) | | | | | | | 1.96 | | 1.96 |
| Total | | | 100 | 100 | 100 | 100 | 100 | 100 | 100 |

TABLE 4b

| Parameter: | Method: | Test Speed/Conditions | Specimen Size | Units | 12 | 13 | 14 | 15 | 16 | 17 | 18 |
|---|---|---|---|---|---|---|---|---|---|---|---|
| Hardness | ISO 868 | 15 s delay | (thickness/diameter) | Sh D | 29 | 28 | 32 | 30 | 28 | 36 | 28 |
| Scratch Test | ISO 4865-02 | | VW K09 grained 2 mm plaque | rating | 5 | 4 | 4 | 4 | 4 | 3.5 | 4 |

TABLE 4c

| Properties @ RT | | | | | 12 Perpendicular to flow/Flow Direction | 13 Perpendicular to flow/Flow | 14 Perpendicular to flow/Flow | 15 Perpendicular to flow/Flow Direction | 16 Perpendicular to flow/Flow Direction | 17 Perpendicular to flow/Flow Direction | 18 Perpendicular to flow/Flow Direction |
|---|---|---|---|---|---|---|---|---|---|---|---|
| Tensile Strength | ISO 37 | 500 mm/ | | MPa | 5.9/7.4 | 4.2/6.1 | 4.9/7.8 | 5.5/6.3 | 5.1/6.0 | 7.7/9.2 | 5.1/6.0 |
| Elongation at Break | ISO 37 | 500 mm/min | Type 1 dumbbell 2 mm ISO | % | 583/521 | 351/440 | 355/557 | 356/386 | 376/373 | 542/538 | 376/373 |
| Modulus @ 100% Strain | ISO 37 | 500 mm/min | | MPa | 5.1/6.3 | 4.4/5.8 | 5.0/7.1 | 5.5/6.4 | 4.8/5.7 | 7.3/8.3 | 4.8/5.7 |
| Tear Strength | ISO 34-Ba | 500 mm/min | Angle/ without nick 2 mm ISO plaque | kN/m | 52/56 | 36/48 | 39/56 | 50/54 | 43/47 | 58/64 | 43/47 |

TABLE 4d

| Properties: Capillary rheometer | TPE X0202 | 230° C; L/D = 30/1 | | | | 12 | 13 | 14 | 15 | 16 | 17 | 18 |
|---|---|---|---|---|---|---|---|---|---|---|---|---|
| shear rate (1/s) | | 500 | Pellets | [Pa · s] | | 74 | 42 | 52 | 69 | 89 | 55 | 89 |
| | | 1000 | | | | 55 | 34 | 41 | 51 | 66 | 41 | 66 |
| | | 2500 | | | | 35 | 23 | 27 | 32 | 42 | 26 | 42 |
| | | 5000 | | | | 24 | 16 | 19 | 22 | 28 | 18 | 28 |
| Gloss Change | — | after 16 hr/ 120° C. | VW K09 grained | visual | | Yes | Yes | Yes | Yes | Yes | Yes | Yes |

The invention claimed is:

1. A composition comprising:
a propylene-based thermoplastic resin;
an ethylene alpha-olefin polymer;
a peroxide; and
a polysiloxane;
wherein the amount of polysiloxane is from 1 to 10 wt %, based on the total weight of the composition,
wherein the amount of the peroxide is from about 0.05 to about 2.0 wt %, based on the total weight of the composition,
wherein the composition is free of any co-agent, and
wherein a VW K09 grained shaped article made of the composition exhibits a surface gloss change after 96 hours at 120° C. of less than 2.0, as determined in accordance with ASTM D523 at an angle of 60°.

2. The composition of claim 1, wherein the ethylene alpha-olefin polymer in the composition is a copolymer comprising ethylene and one or more of the group consisting of 1-octene, 1-hexene and 1-butene units.

3. The composition of claim 1, wherein the ethylene alpha-olefin polymer in the composition has a density of less than about 0.88 g/cc and/or an MFR of from about 0.3 to about 50 and/or a molecular weight distribution of 1.5 to 4.

4. The composition of claim 1, wherein the ethylene alpha-olefin is a copolymer of ethylene, propylene and optionally a diene, and the diene, if present, is contained in the copolymer in 0 to 10 wt %, based on the total weight of ethylene, propylene and diene units.

5. The composition of claim 4, wherein the copolymer of ethylene, propylene and optionally a diene has a Mooney viscosity of from about 10 to about 500 and/or a molecular weight distribution of 1.5 to 20.

6. The composition of claim 1, wherein the thermoplastic resin is a propylene homopolymer, propylene random copolymer or propylene impact copolymer.

7. The composition of claim 1, wherein the thermoplastic resin is a propylene-based polymer having an MFR of from about 100 to about 3000 dg/min and/or a Tm of from about 155 to about 170° C.

8. The composition of claim 1, wherein the amount of the peroxide, is from about 0.5 to about 1.25wt % based on the total weight of the composition.

9. The composition of claim 1, wherein the peroxide is 2,5-dimethyl-2,5-di(tert-butylperoxy)hexane (DHBP).

10. The composition of claim 1, wherein the ethylene alpha-olefin polymer is a plastomer or a rubber.

11. A shaped article comprising the composition of claim 1.

12. An automotive interior component comprising a shaped article according to claim 11.

13. A method of preparing the composition of claim 1, the method comprising melt blending the thermoplastic resin, the ethylene alpha-olefin polymer, the peroxide in an amount of from about 0.05 to about 2.0 wt %, based on the total weight of the composition, and the polysiloxane in an amount of 1 to 10 wt %, based on the total weight of the composition.

14. The method of reducing surface gloss change according to claim 13, wherein the surface gloss change of a VW K09 grained shaped article made of the composition is less than 2.0 after 96 hours at 120° C., as determined in accordance with ASTM D523 at an angle of 60°.

15. An injection molding process comprising melting a composition according to claim 1 in an extruder, and injection molding the composition.

16. The process of claim 15 comprising the sequential injection of two or more compositions into a single mold having two or more inlets, wherein in a first injection step a core part is formed and in a second injection step the core part is overmolded with the composition according to claim 1.

17. A method of making a shaped article, the method comprising the injection molding process according to claim 15, and optionally comprising graining the surface of the shaped article.

\* \* \* \* \*

UNITED STATES PATENT AND TRADEMARK OFFICE
CERTIFICATE OF CORRECTION

PATENT NO.        : 8,592,524 B2
APPLICATION NO.   : 12/811287
DATED             : November 26, 2013
INVENTOR(S)       : Trazollah Ouhadi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 198 days.

Signed and Sealed this
Twenty-second Day of September, 2015

Michelle K. Lee
*Director of the United States Patent and Trademark Office*